United States Patent Office 2,928,836
Patented Mar. 15, 1960

2,928,836

PRODUCTION OF SULFUR TRIOXIDE ADDITION PRODUCTS

Everett E. Gilbert, Morristown, and Henry R. Nychka, Shongum Lake, N.J., assignors to Allied Chemical Corporation, New York, N.Y., a corporation of New York No Drawing. Application October 29, 1958
Serial No. 770,272

11 Claims. (Cl. 260—294.8)

The present invention relates to addition products of organic tertiary nitrogen bases and sulfur trioxide. More particularly, the invention relates to improved processes for the production of high yields of addition products of organic tertiary nitrogen bases and sulfur trioxide.

There are several methods known for the preparation of addition products of organic tertiary nitrogen bases and sulfur trioxide. For example, U.S.P. 2,739,150 of March 20, 1956, describes the preparation of these addition products by reacting the organic base with sulfur trioxide in the absence of solvent. Also, the addition products have been made by carrying out the reaction in the presence of organic solvents, such as chloroform and carbon tetrachloride. Both of these procedures (i.e., with or without organic solvent) are inefficient and generally unsatisfactory. When no solvent is used, decomposition occurs with lowering in quality of the addition products. When an organic solvent is used, the quality of the addition products is also low.

An object of the present invention is to provide improved processes for producing high yields of addition products of organic tertiary nitrogen bases and sulfur trioxide.

A further object of the invention is to provide efficient and economical processes for producing high yields of addition products of organic tertiary nitrogen bases and sulfur trioxide having improved quality.

Other objects and advantages of the invention will be apparent from the following description and examples.

According to the present invention, the above objects are realized by reacting an organic tertiary nitrogen base with sulfur dioxide to form a sulfur dioxide complex, and then reacting the sulfur dioxide complex with sulfur trioxide, said organic base and sulfur trioxide being employed in stoichiometric quantities.

The organic tertiary nitrogen bases employed in the process of the present invention may be pyridine, dimethylaniline, trimethylamine, triethylamine, tripropylamine, tributylamine, dimethylbenzylamine, cyclohexyldimethylamine, N-methyl morpholine, the picolines and other similar organic tertiary nitrogen bases. As desired or required, the base may be introduced in either gaseous or liquid form.

The sulfur trioxide employed may be derived from any suitable source and may be in either gaseous or liquid form. However, we have found that the sulfur trioxide is conveniently used in stabilized liquid form.

As preferred, a mono-sulfur trioxide addition product is produced by employing the organic tertiary nitrogen base and sulfur trioxide in equimolecular quantities. We have found that if an excess of either of these reactants is used, the quality of the mono-sulfur trioxide addition product is lowered. However, it is within the scope of the present invention to employ the reactants in ratio of two mols of sulfur trioxide to one mol of organic base in order to produce a di-sulfur trioxide addition product.

The equations represented by each of these reactions (using pyridine as reactant) are set forth below:

(1) $C_6H_5N + SO_2 \rightarrow C_6H_5N.SO_2$
 sulfur dioxide complex (2) $C_6H_5N.SO_2 + SO_3 \rightarrow C_6H_5N.SO_3 + SO_2$
 mono-sulfur trioxide addition product or (3) $C_6H_5N.SO_2 + 2SO_3 \rightarrow C_6H_5N.2SO_3 + SO_2$
 di-sulfur trioxide addition product A preferred embodiment of the present invention involves forming the sulfur dioxide complex by reacting the organic tertiary nitrogen base with at least about a stoichiometric amount of liquid sulfur dioxide. In this process, the sulfur dioxide acts not only as reactant but also as reaction solvent.

The process of the preferred embodiment is generally carried out by introducing liquid sulfur dioxide into a reactor which permits efficient cooling and agitation of the reactants. The organic tertiary nitrogen base is then added to the liquid sulfur dioxide, preferably below the surface thereof, the sulfur dioxide being refluxed at its boiling point, i.e., at about $-10°$ C. Finally, sulfur trioxide is added to the reaction mixture to convert the intermediate sulfur dioxide complex into the corresponding sulfur trioxide addition product.

The sulfur trioxide addition product is obtained in slurry form. Sulfur dioxide is evaporated off from the slurry by heating and may then be recycled in liquid form as charge to the reactor. Stirring action should be employed during sulfur dioxide evaporation in order to prevent lump formation and facilitate product removal from the reactor. For example, a pug mixer or ball-type mixer may be suitably used. The dry cake, if desired, may be slurried with cold water, filtered and washed with additional water to produce a sulfur trioxide addition product which is for all intents and purposes substantially pure.

We have discovered that when addition products of organic tertiary nitrogen bases and sulfur trioxide are formed by reacting the organic base with sulfur trioxide dissolved in solvents, including liquid sulfur dioxide, the resultant addition product usually contains substantial amounts of by-product acids which may render the product unsuitable for certain industrial uses. If these acidic materials are present in too large quantities, the addition product may even become gummy instead of free-flowing. On the other hand, by carrying out the process in accordance with the present invention, the addition products are produced not only in high yield but also with reduced formation of acidic by-products.

In order to determine the amount of acidic materials (acid equivalent value) present, the addition product is slurried in distilled water maintained desirably at a temperature of about $20°$ to $40°$ C. The aqueous solution is filtered from the addition product and is then titrated with 0.1 N.NaOH solution to a permanent pink color of phenolphthalein indicator. Theoretically, pure addition product possesses no acid equivalent value. This value is therefore a measure of purity; the lower the value the purer the product. The acid equivalent value, e.g., of a mono-sulfur trioxide addition product, may be expressed in terms of mols of caustic soda consumed per mol of addition product. Assuming that the acidic impurities are monobasic having molecular weights equal to that of the addition product, the quality of the addition product may be expressed in terms of percent assay as follows:

percent assay = (1 − acid equivalent) × 100

The intermediate sulfur dioxide complex may be produced in almost quantitative yield by employing the liquid sulfur dioxide in at least stoichiometric quantity with respect to the organic tertiary nitrogen base. Moreover, in order to produce a reaction mixture of sulfur trioxide addition product and sulfur dioxide which is sufficiently fluid for pumping and heat removal, it may be necessary to employ a stoichiometric excess of liquid sulfur dioxide. Excellent results have been obtained when such an excess of liquid sulfur dioxide is used that the weight ratio of liquid sulfur dioxide to sulfur trioxide addition product is maintained in the range of about 1.5 to 4.3:1, and preferably about 3 to 4:1.

The reactions of this embodiment of the invention are conveniently carried out at the boiling point of liquid sulfur dioxide, i.e., at about −10° C. However, it is equally suitable to operate under superatmospheric pressure at a higher temperature, say up to about 100° C. For example, if a temperature of about 50° to 60° C. is used, the corresponding pressure will be about 100 to 150 p.s.i.g. At these temperatures water may be suitably used as coolant. When operating at atmospheric pressure, as preferred, refrigeration is required for condensing the refluxing sulfur dioxide during the reaction.

In using superatmospheric pressure, a pressure-resistant reactor equipped with a jacket or coils for water cooling is charged with liquid sulfur dioxide at about room temperature. With cooling and agitation the organic base is added as rapidly as possible, maintaining the internal temperature, e.g., at about 50° to 60° C. Then addition of sulfur trioxide is begun, also with cooling and agitation. After addition of the sulfur trioxide, the sulfur dioxide is vented with continued agitation and warming to maintain the temperature at about 50° to 60° C.

Although the process of this embodiment of the invention may be conveniently carried out by reacting the organic tertiary nitrogen base with liquid sulfur dioxide, followed by addition of the sulfur trioxide to the intermediate sulfur dioxide complex, any other mode of reactant addition which results in formation of the sulfur dioxide complex before appreciable reaction with sulfur trioxide may be followed with realization of the objects of the invention. For example, a solution of the organic base in liquid sulfur dioxide may be added to liquid sulfur trioxide, preferably dissolved in a solvent such as liquid sulfur dioxide.

In addition to obtainment of high yields of sulfur trioxide addition product having improved quality, the use of liquid sulfur dioxide as set forth above possesses several other advantages. It has a favorable boiling point (about −10° C.) for functioning as an auto-refrigerant and for easy and complete recovery. Moreover, less liquid sulfur dioxide is required than when using organic solvents. This means that smaller and less expensive equipment may be employed.

According to another embodiment of the present invention, the sulfur dioxide complex may be formed by reacting the organic tertiary nitrogen base with sulfur dioxide in the presence of an inert organic solvent. Although the sulfur dioxide may be employed in liquid form, it is used preferably as a gas. Efficient operation is realized by employing the sulfur dioxide in about stoichiometric amount with respect to the organic base. Although larger amounts of sulfur dioxide are not detrimental, they are unnecessary and uneconomical.

Suitable inert organic solvents include halogenated (preferably chlorinated) hydrocarbons such as ethylene chloride, methylene chloride, chloroform, tetrachloroethylene, dichlorodifluoroethylene, etc. The solvent is employed in weight ratio to sulfur trioxide addition product of at least about 2:1, and preferably about 2 to 10:1.

In this embodiment of the invention, operation above about −10° C. is permitted without using a pressure vessel. Thus, suitable reaction temperature ranges from about 0° to 50° C. Moreover, when gaseous sulfur dioxide is used, the added expense of liquefying sulfur dioxide is avoided.

The addition products of organic tertiary nitrogen bases and sulfur trioxide prepared in accordance with the processes of the present invention are extremely useful reagents for sulfonation, sulfation and sulfamation, e.g., in the production of leuco vat dyes, sulfated carbohydrates, sulfamates, etc.

The invention may be illustrated by the following examples in which parts are by weight.

*Example 1*

538 parts of liquid sulfur dioxide were placed in a glass reactor equipped with a Dry Ice condenser and a mechanical stirrer and cooled in a Dry Ice-acetone bath so that the sulfur dioxide refluxed at its boiling point (about −10° C.). 158.2 parts of liquid pyridine were added to the refluxing sulfur dioxide with stirring over a 20-minute period. Then 160 parts of "Sulfan" (stabilized liquid sulfur trioxide) were added with stirring over a 60-minute period. Sulfur dioxide was evaporated off, and remaining traces of sulfur dioxide were removed by drying in a vacuum desiccator. The residue comprised the monosulfur trioxide addition product of pyridine. 308 parts of the addition product, representing a yield of 97% of theory, were obtained. Analysis of the product gave an acid equivalent value of <0.04 (>96% assay).

*Example 2*

313 parts of liquid sulfur dioxide were placed in the apparatus of Example 1. 39.5 parts of liquid pyridine were added to the refluxing sulfur dioxide with stirring over a 20-minute period. Then 40 parts of "Sulfan" were added with stirring over a 30-minute period. Sulfur dioxide was evaporated off, and remaining traces of sulfur dioxide were removed by drying in a vacuum desiccator. The residue comprised the mono-sulfur trioxide addition product of pyridine. 78 parts of the addition product, representing a yield of 98% of theory, were obtained. Analysis of the product gave an acid equivalent value of 0.07 (93% assay).

When a pyridine-sulfur trioxide addition product was prepared under similar conditions except for reacting pyridine with sulfur trioxide dissolved in liquid sulfur dioxide, the addition product had an assay of only 85% (acid equivalent value=0.15).

*Example 3*

The di-sulfur trioxide addition product of pyridine was prepared as follows. 433 parts of liquid sulfur dioxide were placed in the apparatus of Example 1. 39.5 parts of liquid pyridine were added to the refluxing sulfur dioxide with stirring. Then 80 parts of "Sulfan" were added with stirring. The total time of addition was 45 minutes. Sulfur dioxide was evaporated off, and residual sulfur dioxide was removed by drying in a vacuum desiccator. The residue was the di-sulfur trioxide addition product of pyridine. 114 parts of the addition product, representing a yield of 95.4% of theory, were obtained.

*Example 4*

522 parts of liquid sulfur dioxide were placed in the apparatus of Example 1. 56 parts of liquid trimethylamine were added to the refluxing sulfur dioxide with stirring over a 15-minute period. 38 parts of "Sulfan" were added to one-half of the sulfur dioxide complex so formed with stirring over a period of 20 minutes. Sulfur dioxide was evaporated off, and residual sulfur dioxide was removed by drying in a vacuum desiccator. The residue comprised 65 parts of the mono-sulfur trioxide addition product of trimethylamine. This amount of addition product constituted 98% of theory. Analysis of the addition product gave an acid equivalent value of 0.19 (81% assay).

Example 5

453 parts of liquid sulfur dioxide were placed in the apparatus of Example 1. 131 parts of liquid trimethylamine were added to the refluxing sulfur dioxide with stirring over a 40-minute period. Then 177 parts of "Sulfan" were added to about one-half of the sulfur dioxide complex so formed with stirring over a period of 1½ hours. Sulfur dioxide was evaporated off, and residual sulfur dioxide was removed by drying in a vacuum desiccator. The residue comprised 298 parts of the mono-sulfur trioxide addition product of trimethylamine. This amount of addition product constituted 97% of theory. Analysis of the product gave an acid equivalent value of 0.20 (80% assay).

When an addition product of trimethylamine and sulfur trioxide was obtained under similar conditions except for reacting trimethylamine with sulfur trioxide dissolved in liquid sulfur dioxide, the addition product had an assay of only 57% (acid equivalent value=0.43).

Example 6

389 parts of liquid sulfur dioxide were placed in the apparatus of Example 1. A gaseous stream of trimethylamine was passed through a tower of 8-mesh calcium chloride. The gas was condensed, and 50 parts thereof were added to the refluxing sulfur dioxide with stirring over a 15-minute period. Then 68 parts of "Sulfan" were added with stirring over a 30-minute period. Sulfur dioxide solvent was evaporated off, and residual sulfur dioxide was removed by drying in a vacuum desiccator. The residue was the mono-sulfur trioxide addition product of trimethylamine. 117.5 parts of the addition product, representing a 100% yield of theory, were obtained. Analysis of the product gave an acid equivalent value of 0.13 (87% assay).

This example shows slight improvement in quality of addition product when the trimethylamine reactant was dried with calcium chloride before use.

Example 7

286 parts of liquid sulfur dioxide were placed in the apparatus of Example 1. 60.5 parts of liquid dimethylaniline were added to the refluxing sulfur dioxide with stirring over a 15-minute period, followed by 40 parts of "Sulfan" over a 30-minute period. Sulfur dioxide was evaporated off, and residual sulfur trioxide was removed by drying in a vacuum desiccator. The residue comprised the mono-sulfur trioxide addition product of dimethylaniline. 100 parts of the addition product, representing a yield of 100% of theory, were obtained.

Examples 1 to 7 are summarized in the following table:

25-minute period, followed by additional stirring for 30 minutes. The temperature was then raised to 40° C. to drive out the sulfur dioxide into the Dry Ice trap. The resultant slurry was filtered, washed with about 243.7 parts of fresh tetrachloroethylene and dried to constant weight. The residue, a nearly white powder, comprised the mono-sulfur trioxide addition product of pyridine. 79.8 parts of the addition product, representing a yield of 99% of theory, were obtained. Analysis of the product gave an acid equivalent value of 0.29 (71% assay).

When a pyridine-sulfur trioxide addition product was prepared under similar conditions, except that no sulfur dioxide was used, the addition product was a tan, pasty material which had an acid equivalent value of 0.73 (27% assay).

While we have described certain embodiments for carrying out the processes of our invention, it will be apparent that many changes may be made without departing from the spirit of the invention.

We claim:

1. A process of preparing an addition product of an organic tertiary nitrogen base and sulfur trioxide which comprises reacting an organic tertiary nitrogen base selected from the group consisting of pyridine, dimethylaniline, trimethylamine, triethylamine, tripropylamine, tributylamine, dimethylbenzylamine, cyclohexyldimethylamine, N-methyl morpholine and picolines with at least about a stoichiometric amount of sulfur dioxide, thereby forming a sulfur dioxide complex, and reacting the sulfur dioxide complex with sulfur trioxide, said organic base and sulfur trioxide being employed in stoichiometric quantities.

2. A process of preparing a mono-sulfur trioxide addition product of an organic tertiary nitrogen base which comprises reacting an organic tertiary nitrogen base selected from the group consisting of pyridine, dimethylaniline, trimethylamine, triethylamine, tripropylamine, tributylamine, dimethylbenzylamine, cyclohexyldimethylamine, N-methyl morpholine and picolines with at least about a stoichiometric amount of sulfur dioxide, thereby forming a sulfur dioxide complex, and reacting the sulfur dioxide complex with sulfur trioxide, said organic base and sulfur trioxide being employed in equimolecular quantities.

3. A process of preparing a mono-sulfur trioxide addition product of an organic tertiary nitrogen base which comprises reacting an organic tertiary nitrogen base selected from the group consisting of pyridine, dimethylaniline, trimethylamine, triethylamine, tripropylamine, tributylamine, dimethylbenzylamine, cyclohexyldimethylamine, N-methyl morpholine and picolines with a stoichiometric excess of liquid sulfur dioxide, thereby forming a sulfur dioxide complex, and reacting the sulfur dioxide complex with sulfur trioxide, said organic base

|  | Example 1 | Example 2 | Example 3 | Example 4 | Example 5 | Example 6 | Example 7 |
|---|---|---|---|---|---|---|---|
| organic base | pyridine | pyridine | pyridine | trimethylamine | trimethylamine | trimethylamine | dimethylaniline |
| organic base (mols) | 2.0 | 0.5 | 0.5 | 0.47 | 2.22 | 0.85 | 0.5 |
| sulfur trioxide (mols) | 2.0 | 0.5 | 1.0 | 0.47 | 2.22 | 0.85 | 0.5 |
| reaction temperature, °C | −10 | −10 | −10 | −10 | −10 | −10 | −10 |
| weight ratio of sulfur dioxide to sulfur trioxide addition product | 1.8 | 3.9 | 3.8 | 3.9 | 1.5 | 3.3 | 2.9 |
| crude yield (percent of theory) | 97 | 98 | 95 | 98 | 97 | 100 | 100 |
| assay | 97 | 93 | | 81 | 80 | 87 | |

Example 8

500 parts of tetrachloroethylene and 39.5 parts of pyridine were mixed in a reactor equipped with a Dry Ice trap, a mechanical stirrer and an external bath. 35 parts of dry sulfur dioxide gas were introduced into the vessel over a 30-minute period with stirring and cooling to a temperature of 22° to 30° C. The reaction mixture was further cooled to 0° to −5° C., and 41 parts of "Sulfan" were added dropwise with stirring over a and sulfur trioxide being employed in equimolecular quantities.

4. A process of preparing a mono-sulfur trioxide addition product of an organic tertiary nitrogen base which comprises reacting an organic tertiary nitrogen base selected from the group consisting of pyridine, dimethylaniline, trimethylamine, triethylamine, tripropylamine, tributylamine, dimethylbenzylamine, cyclohexyldimethylamine, N-methyl morpholine and picolines with at least about a stoichiometric amount of sulfur dioxide in the presence of an inert organic solvent, thereby forming a sulfur dioxide complex, and reacting the sulfur dioxide complex with sulfur trioxide, said organic base and sulfur trioxide being employed in equimolecular quantities.

5. A process of preparing a mono-sulfur trioxide addition product of pyridine which comprises reacting the pyridine with a stoichiometric excess of liquid sulfur dioxide, thereby forming a sulfur dioxide complex, and reacting the sulfur dioxide complex with sulfur trioxide, said pyridine and sulfur trioxide being employed in equimolecular quantities.

6. A process of preparing a mono-sulfur trioxide addition product of pyridine which comprises reacting the pyridine with at least about a stoichiometric amount of sulfur dioxide in the presence of an inert organic solvent, thereby forming a sulfur dioxide complex, and reacting the sulfur dioxide complex with sulfur trioxide, said pyridine and sulfur trioxide being employed in equimolecular quantities.

7. A process of preparing a mono-sulfur trioxide addition product of dimethylaniline which comprises reacting the dimethylaniline with a stoichiometric excess of liquid sulfur dioxide, thereby forming a sulfur dioxide complex, and reacting the sulfur dioxide complex with sulfur trioxide, said dimethylamine and sulfur trioxide being employed in equimolecular quantities.

8. A process of preparing a mono-sulfur trioxide addition product of dimethylaniline which comprises reacting the dimethylaniline with at least about a stoichiometric amount of sulfur dioxide in the presence of an inert organic solvent, thereby forming a sulfur dioxide complex, and reacting the sulfur dioxide complex with sulfur trioxide, said dimethylaniline and sulfur trioxide being employed in equimolecular quantities.

9. A process of preparing a mono-sulfur trioxide addition product of trimethylamine which comprises reacting the trimethylamine with a stoichiometric excess of liquid sulfur dioxide, thereby forming a sulfur dioxide complex, and reacting the sulfur dioxide complex with sulfur trioxide, said trimethylamine and sulfur trioxide being employed in equimolecular quantities.

10. A process of preparing a mono-sulfur trioxide addition product of trimethylamine which comprises reacting the trimethylamine with at least about a stoichiometric amount of sulfur dioxide in the presence of an inert organic solvent, thereby forming a sulfur dioxide complex, and reacting the sulfur dioxide complex with sulfur trioxide, said trimethylamine and sulfur trioxide being employed in equimolecular quantities.

11. A process of preparing a mono-sulfur trioxide addition product of an organic tertiary nitrogen base which comprises reacting an organic tertiary nitrogen base selected from the group consisting of pyridine, dimethylaniline, trimethylamine, triethylamine, tripropylamine, tributylamine, dimethylbenzylamine, cyclohexyldimethylamine, N-methyl morpholine and picolines with a stoichiometric excess of liquid sulfur dioxide, thereby forming a sulfur dioxide complex, and reacting the sulfur dioxide complex with sulfur trioxide, said organic base and sulfur trioxide being employed in equimolecular quantities and the weight ratio of liquid sulfur dioxide to sulfur trioxide addition product being in the range of about 1.5 to 4.3:1.

References Cited in the file of this patent

UNITED STATES PATENTS

| 2,454,978 | Scalera et al. | Nov. 30, 1948 |
| 2,502,839 | Hardy | Apr. 4, 1950 |
| 2,507,944 | Taras | May 16, 1950 |
| 2,691,040 | Bloch et al. | Oct. 5, 1954 |
| 2,739,150 | Taras | Mar. 20, 1956 |

OTHER REFERENCES

Moede et al.: J. Am. Chem. Soc., vol. 71, pp. 852–8 (1949).